United States Patent [19]
Matsui et al.

[11] Patent Number: 5,744,536
[45] Date of Patent: Apr. 28, 1998

[54] RUBBER COMPOSITIONS

[75] Inventors: Hideki Matsui; Takashi Hamada; Shigeo Kimura, all of Kodaira, Japan

[73] Assignee: Bridgestone Corporation, Tokyo, Japan

[21] Appl. No.: 421,905

[22] Filed: Apr. 14, 1995

[30] Foreign Application Priority Data

Apr. 26, 1994 [JP] Japan .................................. 6-088335

[51] Int. Cl.$^6$ ........................................................ C08K 3/04
[52] U.S. Cl. .......................... 524/492; 524/493; 524/495; 524/496
[58] Field of Search .................................... 524/492, 493, 524/495, 496

[56] References Cited

U.S. PATENT DOCUMENTS

| | | | |
|---|---|---|---|
| 4,894,409 | 1/1990 | Shimada et al. | 524/492 |
| 5,132,357 | 7/1992 | Endter | 524/496 |
| 5,227,425 | 7/1993 | Rauline | 524/493 |
| 5,328,949 | 7/1994 | Sandstrom et al. | 524/262 |
| 5,409,969 | 4/1995 | Hamada | 323/213 |
| 5,516,833 | 5/1996 | Ohashi et al. | 524/495 |

FOREIGN PATENT DOCUMENTS

| | | |
|---|---|---|
| 0501227A1 | 12/1992 | European Pat. Off. . |
| 4008741 | 1/1992 | Japan . |
| 9204783 | 6/1992 | Rep. of Korea . |

OTHER PUBLICATIONS

"Carbon Blacks for Rubber Applications"; Cabot Corporation, (1989).

*Primary Examiner*—Edward J. Cain
*Attorney, Agent, or Firm*—Sughrue, Mion, Zinn, Macpeak & Seas, PLLC

[57] ABSTRACT

A rubber composition suitable for use in pneumatic tires comprises a particular amount of a high-structure carbon black having specified DBP and $N_2SA$ and a particular amount of silica based on diene rubber ingredient.

3 Claims, No Drawings

RUBBER COMPOSITIONS

BACKGROUND OF THE INVENTION

1. Field of the Invention

This invention relates to rubber compositions and more particularly to a rubber composition suitable for use in pneumatic tires.

2. Description of the Related Art

Carbon black is widely used as a reinforcing agent for rubber up to now. In general, dibutyl terephthalate absorption (DBP) is within a range of 100–130 ml/100 g as an important colloidal property in the carbon black used. Because, when the value of DBP is too small, the reinforcing effect is not obtained, while when it is too large, there is caused a fear of lowering the resistance to fatigue failure. Particularly, when the carbon black is applied to a tread rubber, it has frequently the DBP of 100–120 ml/100 g.

Recently, silica is noticed as a reinforcing agent for rubber from viewpoints that the need for low fuel consumption is raised and the running performance on wet road surface is ensured.

However, when the silica compounding is compared with the case of compounding carbon black, it has some drawbacks that the shrinking quantity of unvulcanized rubber is increased to degrade the processability, and the dispersibility in the unvulcanized rubber becomes poor to degrade the wear resistance at a higher input after the vulcanization, and the static electrification becomes large to cause a fear of giving displeasure due to static electricity, and the like.

Lately, it is attempted to blend the carbon black with the silica in order to simultaneously establish low rolling resistance, good running performance on wet road surface and the like as a merit of silica and good wear resistance as a merit of carbon black. In this case, DBP of the carbon black used is within the conventionally used range, so that the drawbacks of the silica can not sufficiently be solved. Therefore, it is desired to further improve the above blending effect.

The inventors have previously proposed rubber compositions simultaneously satisfying the rolling resistance and the wear resistance with the use of carbon black having DBP exceeding the conventionally used range from viewpoints of the change of commercial needs and the advance of technique of microscopically controlling carbon black. However, these rubber compositions do not necessarily satisfy all needs on diversified tire performances.

On the other hand, the commercial needs of low fuel consumption are extended to all-season tires and high-performance tires in addition to general-purpose tires aiming at the wear resistance. As a result, it is strongly demanded to develop a technique for establishing various performances of the tire in higher order.

SUMMARY OF THE INVENTION

It is, therefore, an object of the invention to provide a rubber composition having improved properties required in tire or the like such as wear resistance, rolling resistance, running performance on wet road surface, processability, antistatic electrification and the like by compounding particular carbon black and silica as a reinforcing agent for rubber to possess the merits of both carbon black and silica while compensating demerits of both carbon black and silica in order to simultaneously realize the improvement of various tire performances and the low fuel consumption.

According to the invention, there is the provision of a rubber composition comprising 10–100 parts by weight of carbon black having a specific surface area of nitrogen adsorption ($N_2SA$) of 40–200 $m^2/g$ and a dibutyl terephthalate absorption (DBP) of 135–250 ml/100 g and 10–100 parts by weight of silica, based on 100 parts by weight of diene rubber ingredient.

In a preferable embodiment of the invention, the carbon black has DBP of not less than 160 ml/100 g, more particularly 170–200 ml/100 g and $N_2SA$ of 70–115 $m^2/g$, more particularly 70–90 $m^2/g$.

In another preferable embodiment of the invention, a compounding ratio of carbon black to silica is 20/80–80/20, and particularly a total compounding amount of carbon black and silica is 40–160 parts by weight per 100 parts by weight of diene rubber ingredient.

In the other preferable embodiment of the invention, the silica has a surface area by cetyltrimethyl ammonium bromide process (CTAB) of 100–300 $m^2/g$ and DBP of 150–300 ml/100 g.

DESCRIPTION OF THE PREFERRED EMBODIMENTS

The rubber composition according to the invention is suitable for use in pneumatic tires, and is most preferable for use in a tread of the tire. However, it may be applied to the other rubber portion of the tire such as sidewall portion and the like. When the tire tread is constructed with two different rubbers in the radial direction of the tire, the rubber composition according to the invention is usually used as a so-called outer cap rubber, but it may be used as a so-called inner base rubber.

As to the carbon black, when $N_2SA$ is less than 40 $m^2/g$, the wear resistance is degraded, while when it exceeds 200 $m^2/g$, tan δ becomes large and hence the rolling resistance is undesirably degraded. Therefore, $N_2SA$ of the carbon black is restricted to a range of 40–200 $m^2/g$. Preferably, $N_2SA$ is within a range of 70–115 $m^2/g$, more particularly 70–90 $m^2/g$.

On the other hand, when DBP is less than 135 ml/100 g, the dispersibility of silica is not improved, while when it exceeds 250 ml/100 g, it is technically difficult to produce and use such a carbon black. According to the invention, therefore, DBP of the carbon black is restricted to a range of 135–250 ml/100 g, preferably not less than 160 ml/100 g, more particularly 170–200 ml/100 g.

When the amount of carbon black compounded is less than 10 parts by weight based on 100 parts by weight of diene rubber ingredient, the effect of improving the dispersibility and wear resistance by the compounding of carbon black is less, while when it exceeds 100 parts by weight, the effect of simultaneously establishing the low rolling resistance and the improvement of the running performance on wet road surface with the addition of silica is less and also the wear resistance is undesirably lowered.

Similarly, when the amount of silica compounded is less than 10 parts by weight, the effect of improving the running performance on wet road surface by the compounding of silica is less, while when it exceeds 100 parts by weight, the rolling resistance and wear resistance are undesirably degraded.

In the preferred embodiment of the invention, when the compounding ratio of silica to carbon black is less than 20/80 (amount of silica is less), the effect of simultaneously establishing the low rolling resistance and the improvement of the running performance on wet road surface is less as mentioned above, while when it exceeds 80/20 (amount of carbon black is less), the dispersibility is undesirably lowered to degrade the wear resistance.

In this preferred case, when the total compounding amount of silica and carbon black is less than 40 parts by weight, the sufficient reinforcing effect and the running performance on wet road surface are not obtained, while when it exceeds 160 parts by weight, the wear resistance and the rolling resistance begin to be degraded.

Moreover, when the silica to be compounded satisfies a surface area by CTAB process of 100–300 m$^2$/g and DBP of 150–300 ml/100 g, the reinforcing property enough to improve the wear resistance is obtained and also it is effective to simultaneously establish good running performance on wet road surface and rolling resistance.

The interaction between silica and carbon black will be described below.

(1) The dispersibility of silica into polymer is poor as compared with the usually used carbon black owing to its particle size and property of surface functional group. Furthermore, the wear resistance at a large deformation region as in the tire mainly running on mountain and slope roads is poor, which results from the reinforcing mechanism in the polymer.

However, the dispersibility of silica is improved by combining with carbon black defined in the invention or high-structure carbon black. Furthermore, the high-structure carbon black is superior to the usually used carbon black in the followability at large deformation region and the reinforcing property. That is, the degradation of the wear resistance at a large input as a drawback in the silica compounding is prevented by the addition of the high-structure carbon black.

(2) In the silica compounding, the hysteresis loss of the rubber composition becomes large in the large deformation as compared with the case of compounding the usually used carbon black, but is small in the slight deformation. This is advantageous to improve the running performance on wet road surface and reduce the rolling resistance.

(3) In general, the high-structure carbon black is known to be poor in the resistance to fatigue failure at repetitive input owing to its orientation. Since the silica compounding is excellent in the resistance to fatigue failure as compared with the carbon black, the drawback of the high-structure carbon black can be solved by combining with the silica compounding.

(4) In the silica compounding, the electrical resistance properties of the rubber composition becomes large and causes static electrification through repetitive input (occurrence of static electricity), which results in the application of unpleasant to a user. On the other hand, the high-structure carbon black according to the invention is high in the electrical conductivity as compared with the usually used carbon black and current easily flows (no storing of static electricity), so that the above drawback in the silica compounding can be eliminated by the compounding the high-structure carbon black. Furthermore, the resistance to static electrification in the tire can be increased by increasing the compounding amount of the high-structure carbon black according to the invention.

(5) In the silica compounding, the shrinking quantity of unvulcanized rubber becomes large as compared with the compounding of usually used carbon black, so that the tackiness is poor and the processability is degraded. On the other hand, the high-structure carbon black according to the invention is small in the shrinking quantity as compared with the usually used carbon black and has a sufficient tackiness, so that the degradation of the processability in the silica compounding can be prevented by combining with the compounding of the high-structure carbon black.

(6) As mentioned above, the combination of the high-structure carbon black and silica according to the invention largely serves to the improvement of the running performance on wet road surface and the reduction of the rolling resistance. Particularly, the dispersibility of silica is improved by such a combination to more reduce the rolling resistance.

The carbon black used in the invention can be produced by using a usual oil furnace as follows.

That is, a starting material of high aromatic ingredient having a uniform composition is sprayed into a narrow region inside the furnace through a nozzle forming oil droplets at a smaller distribution. In this case, the reaction time can be equalized by making distributions of furnace temperature and combustion gas stream smaller, whereby the desired carbon black can be obtained (see samples 1, 2 in Comparative Example 3 and Examples 1–3).

The following examples are given in illustration of the invention and are not intended as limitations thereof.

Various rubber compositions are prepared according to a compounding recipe shown in Table 1 and the dispersibility, volume resistivity, shrinking quantity, wear resistance, rolling resistance and running performance on wet road surface are evaluated with respect to each rubber composition as follows:

(1) Dispersibility

The evaluation of the dispersibility is conducted by measuring average particle size, total area and area ratio through SEM-IA (scanning electron microscope-image processing apparatus) process. The smaller the value, the better the dispersibility.

Moreover, the measurement is carried out as follows:

A sample to be measured (tread rubber taken out from a tire) is cut in ethanol by means of a razor's edge cleaned with chloroform.

In order to uniformize cut section, a new razor is used every the sample.

Then, the cut sample is subjected to a electrically conducting treatment (carbon coater) to prepare a measuring specimen (size: 20×10 mm).

The specimen is photographed into two fields of reflected electron image (composition image) by SEM (magnification×100, applied voltage: 25–30 kV).

In the photographing, a brightness of color shading in underground is set to 0 level (black), and a brightness of secondary electron (SEI) and reflected electron (BEI) detecting device is set so as to intensify a contrast.

The particle size, total area and area ratio are measured from the photograph by IA processing. Concretely, the particles included in a field of 900×1200 μm is counted, from which the particle size, total area and area ratio are evaluated. In this case, the measurement of each specimen are carried out at two fields, from which an average value is calculated for the evaluation. Moreover, the term "area ratio" means a ratio of the total area to a measuring field area.

As SEM and IA, commercially available general-purpose devices are used.

(2) Volume resistivity

It is measured by means of ADVANTEST High Megohm Meter TR8601 (commercially available device).

(3) Shrinking quantity

A sample of 30 cm in length is extruded through MPT (Monsanto Processability Tester) at a shear rate of 153.63 1/sec and left to stand on a talc for 24 hours, and thereafter the shrinking quantity with respect to the initial length of 30 cm is measured. The shrinking quantity of each sample is represented by an index value on the basis that Comparative Example 1 is 100. The larger the index value, the smaller the shrinking quantity.

(4) Wear resistance

Each rubber composition is applied to a tread of a passenger car tire having a tire size of 195/65R15. Then, the tire is mounted onto a vehicle having an engine displacement of 2500 cc and actually run on a test course of general express road specification or mountain-slope road specification over a distance of 20000 km, and thereafter the depth of the remaining groove in the tread is measured. The measured value is represented by an index on the basis that Comparative Example 1 is 100. The larger the index value, the better the wear resistance.

(5) Rolling resistance (RR)

Each rubber composition is applied to a tread of a passenger car tire having a tire size of 195/65R15, which is mounted onto a rim of 6JJ under an internal pressure of 2.0 kgf/cm$^2$ and run on a drum at a speed of 80 km/h under a load of 440 kg and then the rotation of the drum is stopped, during which the rolling resistance is measured. The rolling resistance is represented by an index on the basis that Comparative Example 1 is 100. The larger the index value, the better the rolling resistance.

(6) Running performance on wet road surface (WET performance)

The test tire is mounted onto a trailer and run on a wet asphalt-paved road according to a method defined in UTQGS (tire quality grade standard) of USA, during which a friction resistance in the locking of tire rotation is measured. The measured value is represented by an index on the basis that Comparative Example 1 is 100. The larger the index value, the better the WET performance.

TABLE 1

|  | Comparative Example 1 | | Comparative Example 2 | | Comparative Example 3 | | Comparative Example 4 | |
| --- | --- | --- | --- | --- | --- | --- | --- | --- |
| Polymer | Tuf2530*[1] | 96.25 | Tuf2530 | 96.25 | Tuf2530 | 96.25 | Tuf2530 | 96.25 |
|  | BR01*[2] | 30.0 | BR01 | 30.0 | BR01 | 30.0 | BR01 | 30.0 |
| Carbon black | N339 | | N110 | | sample 1 | | | |
| $N_2SA$/DBP | 80/125 | | 140/115 | | 80/185 | | | |
| parts | 60.0 | | 60.0 | | 60.0 | | | |
| Silica | | | | | | | Nipsil AQ*[8] | |
| parts | | | | | | | 60.0 | |
| Coupling agent Si69*[3] | | | | | | | 6.0 | |
| Zinc white | 3.0 | | 3.0 | | 3.0 | | 3.0 | |
| Stearic acid | 2.0 | | 2.0 | | 2.0 | | 2.0 | |
| Antioxidant 6C*[4] | 1.5 | | 1.5 | | 1.5 | | 1.5 | |
| Wax | 1.0 | | 1.0 | | 1.0 | | 1.0 | |
| Aromatic oil | 5.0 | | 5.0 | | 5.0 | | 5.0 | |
| Vulcanization DM*[5] | 1.0 | | 1.0 | | 1.0 | | 1.0 | |
| accelerator DPG*[6] | 0.5 | | 0.5 | | 0.5 | | 0.5 | |
| NS*[7] | 1.0 | | 1.0 | | 1.0 | | 1.0 | |
| Sulfur | 1.5 | | 1.5 | | 1.5 | | 1.5 | |
| Dispersibility |  |  |  |  |  |  |  |  |
| average particle size μm | | | | | | | 8.05 | |
| total area m$^2$ | | | | | | | 27300 | |
| area ratio % | | | | | | | 1.41 | |
| Volume resistivity (Ωcm) | ≦10$^8$ | | ≦10$^8$ | | ≦10$^8$ | | ≧10$^{15}$ | |
| Index of shrinking quantity | 100 | | 120 | | 120 | | 30 | |
| Index of wear resistance |  |  |  |  |  |  |  |  |
| general express road | 100 | | 110 | | 119 | | 148 | |
| mountain-slope roads | 100 | | 112 | | 116 | | 75 | |
| RR index | 100 | | 81 | | 110 | | 132 | |
| Index of WET performance | 100 | | 108 | | 102 | | 120 | |

|  | Comparative Example 5 | | Example 1 | | Example 2 | | Example 3 | |
| --- | --- | --- | --- | --- | --- | --- | --- | --- |
| Polymer | Tuf2530 | 96.25 | Tuf2530 | 96.25 | Tuf2530 | 96.25 | Tuf2530 | 96.25 |
|  | BR01 | 30.0 | BR01 | 30.0 | BR01 | 30.0 | BR01 | 30.0 |
| Carbon black | N339 | | sample 1 | | sample 2 | | sample 1 | |
| $N_2SA$/DBP | 80/125 | | 80/185 | | 110/160 | | 80/185 | |
| parts | 30.0 | | 30.0 | | 30.0 | | 40.0 | |
| Silica | Nipsil AQ | | Nipsil AQ | | Nipsil AQ | | Nipsil AQ | |
| parts | 30.0 | | 30.0 | | 30.0 | | 40.0 | |
| Coupling agent Si69*[3] | 3.0 | | 3.0 | | 3.0 | | 4.0 | |
| Zinc white | 3.0 | | 3.0 | | 3.0 | | 3.0 | |
| Stearic acid | 2.0 | | 2.0 | | 2.0 | | 2.0 | |
| Antioxidant 6C*[4] | 1.5 | | 1.5 | | 1.5 | | 1.5 | |
| Wax | 1.0 | | 1.0 | | 1.0 | | 1.0 | |
| Aromatic oil | 5.0 | | 5.0 | | 5.0 | | 5.0 | |
| Vulcanization DM*[5] | 1.0 | | 1.0 | | 1.0 | | 1.0 | |
| accelerator DPG*[6] | 0.5 | | 0.5 | | 0.5 | | 0.5 | |
| NS*[7] | 1.0 | | 1.0 | | 1.0 | | 1.0 | |
| Sulfur | 1.5 | | 1.5 | | 1.5 | | 1.5 | |

TABLE 1-continued

| Dispersibility | | | | |
|---|---|---|---|---|
| average particle size μm | 6.25 | 5.00 | 5.10 | 5.48 |
| total area m² | 23200 | 9800 | 11000 | 19500 |
| area ratio % | 1.20 | 0.51 | 0.57 | 1.01 |
| Volume resistivity (Ωcm) | $\geq 10^{15}$ | $8.12 \times 10^8$ | $2.38 \times 10^8$ | $\leq 10^8$ |
| Index of shrinking quantity | 50 | 98 | 101 | 110 |
| Index of wear resistance | | | | |
| general express road | 138 | 145 | 140 | 142 |
| mountain-slope roads | 92 | 128 | 130 | 131 |
| RR index | 127 | 130 | 128 | 128 |
| Index of WET performance | 112 | 115 | 117 | 118 |

*¹solution-polymerized SBR, Tuffden (trade name), made by Asahi Chemical Industry Co., Ltd.
*²BR made by Japan Synthetic Ruber Co., Ltd.
*³silane coupling agent, Si69 (trade name), made by DEGUSSA, bis-(3-triethoxysilylpropyl)-tetrasulfide
*⁴N-(1,3-dimethylbutyl)-N'-phenyl-p-phenylene diamine
*⁵dibenzothiazyldisulfide
*⁶diphenylguanidine
*⁷N-tert-butyl-2-benzothiazyl sulfenamide
*⁸CTAB: 184 m²/g, DBP: 200 ml/100 g In the carbon black, $N_2SA$ is measured according to ASTM D3037-89, and DBP is measured according to ASTM D2414-90.

In the silica, CTAB is measured according to ASTM D3765-89 and DBP is measured according to ASTM D2414-90 after the removal of adsorbed water by heating at 200° C. for 15 minutes.

As seen from the results of Table 1, the average particle size, total area and area ratio in each example becomes smaller than those of each comparative example, so that the dispersibility in all examples is improved. Moreover, the dispersibility is very poor in case of compounding only silica (Comparative Example 4), while in Comparative Example 5 compounding silica and carbon black, the dispersibility is improved but is poorer than that of the example because DBP of the carbon black is outside the range defined in the invention.

In all examples, the volume resistivity is equal or near to the values in the case of compounding no silica (Comparative Examples 1-3).

As to the shrinking quantity, the occurrence of the shrinking by the silica compounding (Comparative Examples 4, 5) are sufficiently prevented in all examples.

In all examples, the degradation of the wear resistance at the large deformation region by the silica compounding (course of mountain-slope road specification in Comparative Examples 4, 5) is sufficiently prevented, but also the wear resistance on the course of general express road specification is considerably improved.

In all examples, the rolling resistance is considerably improved as compared with the case of compounding no silica (Comparative Examples 1-3).

In all examples, the running performance on wet road surface is considerably improved as compared with the case of compounding no silica (Comparative Examples 1-3).

As mentioned above, according to the invention, rubber compositions possessing the merits of both carbon black and silica while compensating demerits of both carbon black and silica can be obtained by the combination of the high-structure carbon black and silica. That is, the dispersibility of the silica is improved to improve the wear resistance and decrease the shrinkage. Further, when such a rubber composition is applied to the tire tread, the processability is improved and tires having a low rolling resistance, excellent running performance on wet road surface and a long service life can be obtained.

What is claimed is:

1. A rubber composition comprising 10–100 parts by weight of carbon black having a specific surface area of nitrogen adsorption ($N_2SA$) of 70–90 m²/g and a dibutyl terephthalate absorption (DBP) of 170–200 ml/100 g and 10–100 parts by weight of silica, based on 100 parts by weight of diene rubber ingredient.

2. A rubber composition according to claim 1, wherein a compounding ratio of carbon black to silica is 20/80–80/20, and a total compounding amount of carbon black and silica is 40–160 parts by weight.

3. A rubber composition according to claim 1, wherein said silica has a surface area by cetyltrimethyl ammonium bromide process (CTAB) of 100–300 m²/g and DBP of 150–300 ml/100 g.

* * * * *